United States Patent [19]

Kalus et al.

[11] Patent Number: 4,801,487
[45] Date of Patent: Jan. 31, 1989

[54] IMPRINTABLE SHEET, METHOD FOR THE PRODUCTION THEREOF AND USE THEREOF

[75] Inventors: Peter Kalus, Neckargemund; Hanns-Martin von Truchsess, Aschaffenberg, both of Fed. Rep. of Germany

[73] Assignee: Esselte Meto International GmbH, Fed. Rep. of Germany

[21] Appl. No.: 721,377

[22] Filed: Apr. 9, 1985

[30] Foreign Application Priority Data

Apr. 9, 1984 [DE] Fed. Rep. of Germany ....... 3413371

[51] Int. Cl.[4] .................. B32B 5/16; B32B 27/32; B05D 5/10
[52] U.S. Cl. .................. 428/206; 427/208.6; 427/379; 428/207; 428/323; 428/343; 428/352; 428/914
[58] Field of Search .............. 428/206, 323, 352, 343, 428/207, 914; 427/208.8, 379

[56] References Cited

U.S. PATENT DOCUMENTS 4,138,527 2/1979 Malek ................... 428/352
4,542,059 9/1985 Toganoh et al. ............ 428/206 X

FOREIGN PATENT DOCUMENTS

62690/73 11/1973 Australia ............... 428/323
519410 5/1976 Australia ............... 428/323

*Primary Examiner*—Thomas J. Herbert
*Attorney, Agent, or Firm*—Gerald J. Ferguson, Jr.

[57] ABSTRACT

An imprintable sheet of plastic is proposed having a carrier sheet and a layer applied on at least one side for receiving an imprint in which to improve the absorbency, to increase the drying speed of the imprint and to improve the outline sharpness of the imprint the layer receiving the imprint consists of a firm polymer matrix and microporous finely divided solid particles embedded therein. Furthermore, a method is described for producing such an imprintable sheet. The sheet is preferably used for making imprintable self-adhesive or non-self-adhesive labels.

22 Claims, No Drawings

IMPRINTABLE SHEET, METHOD FOR THE PRODUCTION THEREOF AND USE THEREOF

The invention relates to an imprintable sheet of plastic comprising a carrier sheet and a layer applied on at least one side for receiving an imprint, a method for the production thereof and the use thereof.

It is very difficult or impossible to print or write on conventional plastic films, foils or sheets because they have a smooth closed surface and therefore cannot take up or absorb printing inks or other inks. In addition, the printing inks dry on such conventional sheets only very slowly because the sheets have a very low absorbency or even none at all.

Imprintable plastic foils or sheets are special sheets whose surface has been modified in such a manner that it is porous at least to a certain extent and thus absorbent, enabling the printing inks to penetrate into the superficial layers of the sheets to remain bonded there to a greater or lesser degree, and also providing a more rapid drying of the printing inks.

Various types of imprintable sheets are known:

German utility model No. 8,227,503 discloses laminating a carrier sheet of plastic with a thin paper layer which is finished in special manner to improve the machine readability of an imprint applied to the paper layer. The carrier sheet of plastic serves only to increase the mechanical strength, in particular to improve the resistance to tearing, whilst because of its known porosity and absorbency the paper permits the imprinting. When working with printing inks or other inks with an oil base the oil constituents are rapidly absorbed by the paper so that the imprint becomes resistant to wiping very rapidly. A drying operation in the sense of evaporation does not take place. However, on fluctuations of the air humidity or temperature the two materials of the laminate consisting of plastic and paper expand to different extents and the result is the formation of bubbles and undulations. For this reason, plastic sheets laminated to paper have not proved suitable for making self-adhesive labels.

Another type of imprintable sheet is known from DE-OS No. 2,032,850. These are plastic foils whose surfaces are subsequently made microporous by the coagulation process. Sheets of vinyl polymers, polycarbonates, polamide or cellulose plastics are coated with a composition containing a resin of the same type as that making up the sheet, a plasticizer, pulverulent solid particles, dimethyl formamide as solvent and possibly other constituents. The dimethyl formamide chemically attacks the plastic sheet, i.e. superficially dissolves or swells the latter. The whole is then treated with water, the dimethyl formamide thereby being displaced and the dissolved plastic coagulates with simultaneous formation of micropores. Finally, the sheet is subjected to a heat treatment. Due to the superficial dissolving of the carrier sheet and the subsequent coagulation the finely particulate inorganic powder becomes part of the support sheet. Moreover, the inorganic powder serves solely to improve the opacity, i.e. the optical properties, of the sheet, in particular the light dispersion power. The absorbency decisive for the imprinting of the sheet is obtained solely with the aid of the micropores formed on the coagulation of the dissolved plastic.

In a further known type of an imprintable plastic sheet porosity and thus absorption capacity for printing inks is achieved in that a sheet of a styrene polymer is swollen with the aid of an organic solvent and the solvent than displaced with an non-solvent for the polymer or alternatively with another solvent having a weaker swelling effect on the polymer than the first solvent, and thereupon the sheet treated is dried in air under conditions under which the sheet does not undergo any thermal shrinkage. Imprintable sheets of this type are known from DE-OS No. 2,240,764. It is however emphasised in the publication that the imprintability and inscribability can only be achieved if the sheet consists of a styrene polymer or is at least made up on the basis of a styrene polymer whilst the same effect obviously could not be achieved with sheets of other plastics. However, the styrene polymer used as sheet material may contain additives such as antioxidants, white pigments, dispersion agents, lubricants and antistatic agents in conventional amounts. As white pigments, which are added obviously only to provide colouring, the publication names titanium dioxide, barium sulphate, zinc oxide, calcium carbonate, clay and silicic acid, and as polymer for dispersing the pigment low-molecular polyethylene and ethyl-vinyl acetate copolymer.

With the latter type of imprintable sheets as well the porosity in the plastic material of the carrier sheet is obtained by the coagulation method generally known from the production of water-vapour-permeable artificial leather.

Finally, it is also known to mechanically or chemically roughen and directly imprint the surface of highly polar sheets, i.e. sheets of polymers made up of highly polar monomers. This is for example possible with sheets of polyvinyl chloride and polystyrene. However, with typically "non-polar sheets", i.e. for example sheets of polyethylene or polypropylene, a direct imprinting makes difficulties in respect of adhesion and drying times required, even if the surface tension of these sheets is increased by corona discharges.

With many sheets of low absorbency and poor printing ink absorption remedies have been sought in the form of low printing speeds, strong powdering of the printing surface or using oxidatively drying printing inks.

However, hitherto known specially coated sheets were not suitable for applying a machine-readable type (OCR lettering) or a bar code, in particular with hand printing devices such as hand labelling machines, because the printing ink was not absorbed rapidly enough and above all not with adequate outline sharpness.

With pore structures produced with the aid of the wet coagulation method the outline sharpness of the imprint is generally poor because the line width is increased by lateral flowing away of the printing ink in undesirable manner.

The invention is based on the problem of providing an imprintable sheet of plastic whose porosity, suction power and absorbency for printing inks is improved compared with hitherto known imprintable sheets so that shorter printing times of the imprint can be achieved and thus higher printing speeds, and at the same time an improved outline sharpness of the imprint.

The invention is further based on the problem of providing an improved and simplified method for producing such an imprintable sheet in which not only polar sheets but non-polar sheets can be used, which because of their higher resistance to tearing and low price are of particular interest.

This problem is solved according to the invention by an imprintable sheet of plastic comprising a carrier sheet and a layer applied on at least one side for receiving an imprint, which is characterized in that the layer receiving the imprint consists of a firm polymer matrix and microporous finely divided solid particles embedded therein.

Because the porosity is present in the sheet according to the invention only at defined places within the layer receiving the imprint, i.e. within the microporous finely divided solid particles which are embedded in the firm polymer matrix and thereby firmly held and secured against falling out, not only a high absorbency of the printing ink is achieved and thus a good anchoring of the imprint and rapid drying but at the same time a very considerable improvement of the outline sharpness of the imprint is obtained because the firm polymer matrix itself is not porous. The printing ink can thus penetrate only into the pores of the microporous solid particles, the individual solid particles being however separated from each other by an extremely fine lattice of non-porous firm polymer, i.e. the polymer matrix. At the phase boundary between the microporous solid particles and the non-porous polymer matrix the further penetration of the printing ink is stopped so that lateral flowing apart, synonymous with a reduction in outline sharpness, is prevented.

Preferably, the layer receiving the imprint forms with the carrier sheet an integral composite structure so that no separation phenomena can occur due to different thermal expansion or changes in air humidity.

The polymer matrix of the layer, intended for receiving an imprint, of the sheet according to the invention preferably consists substantially of one or more of the following synthetic or natural polymers: polyacrylates, polymethacrylates, polyesters, polystyrenes, poly-1,3-dienes, e.g. polybutadien, polyamides, polyurethanes, polyvinyl butyral, polyvinyl acetate alkyde resins, urea resins, modified nitrocelluloses, resins modified with shellack or colophony, starch, casein, and their mixed polymers and copolymers.

Particularly suitable as absorbent solid particles embedded in the firm polymer matrix are microporous pigments and/or fillers. Since the assignment of certain mineral substances to the group of the pigments or the group of the fillers cannot always be clearly made and is disputed in some cases in the art (cf. "Ullmanns Enzyklopädie der technischen Chemie", 4th edition, Volume 18, page 548, Verlag Chemie GmbH, D-6940 Weinheim, (1979)), it is pointed out that within the scope of the invention the designation or exact assignment of the solid particles is not important, the only important point being that these particles are finely divided or pulverulent and have a microporous internal structure.

Particularly preferred for the purposes according to the invention is the group of white pigments and white or colourless fillers such as aluminium oxide, barium sulfate titanium dioxide, silicic acid, silicates, chalks, starch, melamine resins and/or formaldehyde resins, in each case in the form of finely divided powder with large specific surface area.

In addition, the layer receiving the imprint can also be coloured, i.e. contain apart from the aforementioned microporous pigments and/or fillers also coloured pigments and/or luminescent pigments which themselves need not be porous. Luminescent pigments is used to mean both fluorescent and phosphorescent pigments.

The carrier sheet can consist according to the invention of any conventional plastic, i.e. may be made up both of polar monomers and of non-polar monomers. However, preferred are carrier sheets of plastics which are formed from non-polar monomers, in particular polyethylene or polypropylene sheets, because these sheets are cheaper and in addition are more resistant to tearing than sheets of polar plastic such as polyvinyl chloride (PVC) and polystyrene. As polyethylene sheets both high-pressure polyethylene and low-pressure polyethylene sheets may be used. The carrier sheets may consist also of polyvinylidene chloride, polycarbonate, polyamide or polyester. The sheets may be filled, coloured, foamed or pretreated or finished in other known manner.

The sheet or foil according to the invention may be provided on one or both sides with a layer for receiving an imprint. When the sheet has an imprintable layer only on one side the other side may be finished to be self-adhesive, i.e. provided in a manner known per se with a pressure sensitive adhesive layer.

The method according to the invention for producing the imprintable foil in which a plastic carrier foil is coated on at least one side to form an absorbent layer for receiving an imprint is characterized by the combination of the following features:

a liquid primer is applied to the side of the carrier sheet to be coated and thereafter, insofar as necessary, dried;

to the side of the carrier sheet thus treated an intimate mixture of at least one binding agent forming a firm polymer matrix by curing and/or crosslinking and microporous finely divided solid particles is applied to form a layer and thereafter, insofar as necessary, dried.

The method according to the invention may be carried out continuously or discontinuously simply and rapidly with the aid of conventional coating apparatuses and machines. With the aid of the liquid bonding agent or primer an intimate chemical and physical bond is obtained between the absorbent layer for receiving the imprint and the carrier sheet, which is preferably so constituted that the layer receiving the imprint forms an integral composite structure with the carrier sheet. As a result, the imprintable layer cannot become detached from the carrier sheet or be peeled off the latter and the composite structure is very stable under changing temperatures and insensitive to variations in humidity so that the sheet can be stored for long periods without impairment of its imprintability even under unfavourable storage conditions and extreme climatic conditions as obtain for instance in tropical countries. For the same reasons it is ensured that labels made from the sheet according to the invention even under unfavourable external conditions do not detach themselves from the surface on which they are placed or stuck even if these surfaces are curved or cover edges or corners.

In a preferred embodiment of the method according to the invention as primer one or more of the following synthetic or natural polymers are used: polyacrylates, polymethacrylates, polyesters, polystyrenes, poly-1,3-dienes, polyamides, polyurethanes, polyvinyl butyral, polyvinyl acetate, alkyde resins, urea resins, modified nitrocelluloses, resins modified with shellack or colophony, and their mixed polymers and copolymers.

The primer is preferably applied in an amount of 0.2 to 0.5 g/m$^2$ with respect to the dry weight.

Since the primer is applied in a very thin layer the coating can even take place by means of a printing machine but of course also by means of a roll coater or any other conventional coating apparatuses suitable for low area weights of the coating.

According to the invention as binding agent forming the polymer matrix one or more of the following polymers is used: polyacrylates, polymethacrylates, polyesters, polystyrenes, poly-1,3-dienes, polyamides, polyurethanes, polyvinyl butyral, polyvinyl acetate, alkyde resins, urea resins, modified nitrocelluloses, resins modified with shellack or colophony, starch, casein, and their mixed polymers and copolymers.

The same polymer can thus be used both as primer and as binding agent forming the polymer matrix, which promotes the firm intimate bonding between the imprintable absorbent layer and the carrier sheet. On the other hand, it is not absolutely essential to use as primer and binding agent forming the polymer matrix in each case the same polymer.

The mixture of the binding agent and the solid particles is advantageously applied in an amount of at least about 2 g/m$^2$ with respect to the dry weight, the range between about 2 and 12 g/m$^2$ being particularly preferred.

In a further advantageous embodiment of the method according to the invention the primer and/or binding agent is used in the form of a solution or dispersion in a suitable solvent. Preferably, the primer and/or binding agent is used in reactively crosslinking and/or solvent-free form because the production method can then be carried out more rapidly and because there are then no problems with possibly inflammable explosive toxic solvent vapours which if present must be condensed and returned in the cycle.

The choice of a suitable solvent is no problem to the expert; it depends on the nature of the polymer used and on the nature of the carrier sheet.

According to the invention as finely divided solid particles preferably microporous pigments and/or fillers are used which preferably belong to the group of the white pigments and the white or colourless fillers such as aluminium oxide, barium sulfate, titanium dioxide, silicic acid, silicates, chalk, starch, melamine and/or formaldehyde resins, in each case in the form of finely divided powder of large specific surface area.

To obtain particularly esthetically appealing effects the mixture of binding agent and solid particles can be coloured by an additive of coloured pigments and/or luminescent pigments, which need not be microporous. In addition, of course, the carrier sheet can also be coloured or uncoloured, contain metal particles of copper, silver, gold, aluminium, brass, bronze or the like in fine dispersion, or have an embossed or ground, roughened or otherwise structured surface.

Preferably, as carrier sheet a foil of a plastic is used which is formed from non-polar monomers. Particularly advantageous are polyethylene and polypropylene sheets because they are available in large quantities at low prices and in addition are more resistant to tearing than the polar sheets.

For one of the particular advantages which are achieved with the invention is precisely that even these non-polar sheets can be used as carrier sheets and nevertheless without any laminating with paper being necessary made imprintable by applying the layer consisting of the polymer matrix and the microporous finely divided solid particles embedded therein.

When the non-polar carrier sheets preferred according to the invention are used, i.e. in particular polyethylene or polypropylene sheets, it is in many cases advantageous to subject these non-polar sheets in a manner known per se to a corona discharge pretreatment in order to increase the surface tension of the sheets. In these cases the corona pretreatment is carried out before the primer is applied because the bonding power of the thin primer layer on the carrier sheet is thereby additionally increased. When using polar carrier sheets the corona pretreatment can as a rule be dispensed with because if does not result in any additional advantage.

A further advantageous embodiment of the method according to the invention resides finally in that one side of the sheet is finished to be self-adhering by means of an adhesive layer.

The imprintable sheet according to the invention can be used in all cases in which a paper-like imprintability is important but at the same time also a higher mechanical strength, in particular higher tear resistance, better stability under temperature change, insensitivity to moisture and humidity fluctuations. Particularly advantageous is the use of the sheet according to the invention for producing imprintable self-adhesive or non-self-adhesive labels which may possibly be finished to be coloured reflecting or luminescent. The sheet according to the invention may further be used as inscribable surface or, with an appropriate imprint, for adhering to signs of all types, for example traffic signs, signposts, and the like. Furthermore, figures of all types can be made from the sheet. The sheet according to the invention is also particularly suitable for making price labels which are imprinted mechanically or with hand printing or hand labelling devices and applied to any surfaces whatever. When the sheet according to the invention is imprinted the outline sharpness obtained is so good that optically or machine-readable lettering (OCR type) and bar codes can be imprinted without difficulty and easily read and identified.

A further particular advantage of the sheet according to the invention resides in the extremely short drying times required for the imprint to dry. Short drying times facilitate handling after imprinting of the sheet or labels made therefrom because the stack height of the imprinted sheets, rolls or tapes can be increased and at the same time the printing speed also increased. Due to the high absorbency of the layer receiving the imprint the latter rapidly becomes resistant to wiping and dry to such an extent that the sheet or tapes cut therefrom can be rolled or wound up practically immediately after the imprinting.

When the sheet according to the invention is used to make labels or label tapes or ribbons which are not cut rectangularly or triangularly but have a more complicated geometrical form so that between every two adjacent labels and between the labels and the edge of the tape or the sheet narrow webs remain when the labels are punched or cut out, the "grid" formed from the remaining webs can be very rapidly peeled from an auxiliary support necessary with self-adhesive finishing, for example a release paper, silicone paper, or the like, without the grid tearing. This means that the production rate when making such self-adhesive labels with complicated geometrical form can be increased or that for the same production rate the grid webs can be made much narrower than hitherto, saving material and resulting in less waste.

Finally, a further advantage which can be obtained with the invention resides in that the absorbency of the layer intended to receive an imprint can be controlled in simple manner and set to the desired value by suitable choice of the quantity ratio between the binding agent forming the firm polymer matrix and the microporous finely divided solid particles. It is obvious that with a small proportion of binding agent the finely divided solid particles cannot be adequately secured in the imprintable layer because the firm polymer matrix cannot form completely. If on the other hand the proportion of binding agent is too high the microporous solid particles will be surrounded by an absolutely sealed envelope of the polymer forming the polymer matrix so that the suction effect of the pores is completely eliminated. The quantity ratio between the binding agent and the microporous solid particles must therefore be so chosen that on the one hand the solid particles do not drop off or fall out of the polymer matrix and on the other pores of the solid particles are not clogged by a sealed envelope. The choice of the correct quantity ratio or a quantity ratio particularly suitable for a certain purpose presents no difficulty to the expert once he has been provided with the teaching according to the invention.

The invention will be explained hereinafter with the aid of some examples:

EXAMPLE 1

A polyethylene sheet is coated with 0.2 g/m$^2$ of a liquid primer by means of a coating apparatus suitable for thin layer applications, for example an intaglio or flexo printing machine. The liquid primer consists of 20 parts ("parts" means in all the following examples always parts by weight) of a 50% solution of polyvinyl chloride/vinyl propionate in ethyl acetate and 50 parts isopropyl acetate. The sheet thus pretreated runs through a drying apparatus and is then coated by means of a conventional coating apparatus, for example a roll coater, with 3 g/m$^2$ of an intimate mixture of 20 parts of a 50% solution of polyvinyl chloride/vinyl propionate in ethyl acetate, 80 parts isopropyl acetate and 5 parts precipitated aluminium oxide and thereafter dried.

EXAMPLE 2

As described in example 1, a polyethylene sheet is coated on one side firstly with 0.2 g/m$^2$ of a liquid primer and therafter with 2 g/m$^2$ of a mixture containing microporous solid particles. As primer a mixture is used of 50 parts of a commercially available plasticized urea resin, 60 parts spirit and 6 parts of a 10% solution of toluene sulfonic acid in spirit. For the second coat a mixture is used of 50 parts of a commercially available plasticized urea resin, 100 parts spirit, 7.5 parts precipitated silicic acid and 6 parts of 10% solution of toluene sulfonic acid in spirit.

EXAMPLE 3

A liquid primer of 12 parts of a crosslinking polyester-aminoplast polymer, 40 parts spirit and 5 parts ethyl glycol is applied to a polyethylene sheet in an amount such that the coating weight in the dried state is 0.2 g/m$^2$. There is applied to the sheet thus treated 5 g/m$^2$, with respect to the dry weight, of a mixture of 12 parts of a crosslinking polyester-aminoplast polymer, 55 parts spirit, 5 parts ethyl glycol, 4 parts of a commercially available daylight luminescent paint and 2 parts finely divided alumina. The procedure is otherwise as described in example 1.

EXAMPLE 4

The procedure is as in example 1. As carrier sheet a polypropylene sheet is used. The liquid primer consists of 50 parts of an acrylic acid-styrene copolymer, 40 parts water, 0.5 parts phosphoric acid and 0.05 parts of a commercially available defoamer. The dry weight of the primer coating is 0.5 g/m$^2$. The second coat consists of a mixture of 59 parts acrylic acid-styrene copolymer, 150 parts water, 1 part of a disperser, 150 parts chalk, 50 parts starch powder, 150 parts casein in the form of a 20% solution in ammonia and 10 parts of a commercially available urea resin. The dry coating weight of the second coat is 8 g/m$^2$.

EXAMPLE 5

A polypropylene sheet is coated with a primer of 35 parts of a vinyl acetate-ethylene copolymer, 50 parts water, 0.2 parts of a dispersion agent and 12 parts chalk in an amount of 0.5 g/m$^2$, with respect to the dry weight. The second coat consists of 100 parts of a commercially available vinyl acetate-ethylene copolymer, 250 parts water, 1 part of a dispersion agent, 100 parts titanium dioxide, 150 parts of a daylight luminescent paint, 400 parts of a 10% aqueous starch solution and 10 parts of a commercially available solution of urea resin and is applied in an amount of 12 g/m$^2$ with respect to the dry weight to the sheet pretreated with the primer. Besides, drying is carried out as described in example 1 and the uncoated side of the polypropylene sheet is provided with a pressure-sensitive adhesive layer which is covered by a release paper.

The commercial products listed below were used to carry out Examples 1 through 5:

Solution of polyvinyl-chloride and vinyl-propionate: Lutofan 210 L, from BASF

Plasticized urea resin: Jagaplast 73 and Jagaplast 43 from Ernst-Jager, at Duesseldorf Crosslinking polyester-aminoplast polymer: Alftalat AN 420, from Joechst AG Acrylic-acid/styrene copolymer: Acronal 21 D from BASF Vinylacetate-ethylene copolymer: Vinnapas E1, from Wacker-Chemie, Munich Precipitated aluminum oxide: aluminum oxide from Degussa Precipitated silicic acid: Aerosil 300 from Degussa Chalk: Socal P 3 from Solvay Titanium dioxide: RN 61 from Kronos Titan, Leverkusen Starch solution: Amisol 5582, from Maizena GmbH, Hamburg Urea resin: Parez Resin 618 from Cyanamid Daylight luminescent paint: Radglo P 1800 or Radglo R 103 from Belgian Co. "Radiant Color".

Defoaming agent: Etingal, from BASF

Dispersant: Polysalz S, from BASF, or Calgon PTH, from Benkieser-Knappsack AG

We claim:

1. In an imprintable sheet of plastic comprising a carrier sheet and a layer applied on at least one side for receiving an imprint with said layer receiving the imprint consisting of a firm polymer matrix and microporous finely divided solid particles embedded therein, the improvement which comprises that said carrier sheet consists of a plastic formed from non-polar monomers and that said layer receiving the imprint forms an integral composite structure with said carrier sheet.

2. Sheet according to claim 1, in which said carrier sheet consists of polyethylene or polypropylene.

3. Sheet according to claim 1, finished to be self-adhesive.

4. Sheet according to claim 1, in which said solid particles are at least one of microporous pigments and fillers.

5. Sheet according to claim 1, in which said layer receiving the imprint additionally contains at least one of color pigments and luminescent pigments.

6. Imprintable label comprising an imprintable sheet of plastic comprising a carrier sheet and a layer applied on at least one side for receiving an imprint with said layer receiving the imprint consisting of a firm polymer matrix and microporous finely divided solid particles embedded therein, wherein said carrier sheet consists of a plastic formed from non-polar monomers and said layer receiving the imprint forms and integral composite structure with said carrier sheet.

7. The label of claim 6, wherein said carrier sheet consists of polyethylene or polypropylene.

8. The label of claim 6, wherein said sheet is finished to be self-adhesive.

9. The label of claim 6, wherein said solid particles are at least one of microporous pigments and fillers.

10. The label of claim 6, wherein said layer receiving the imprint additionally contains at least one of color pigments and luminescent pigments.

11. In a method for producing an imprintable sheet, wherein a plastic carrier sheet is coated on at least one side to form an absorbent layer for receiving an imprint, the improvement which comprises:
   employing a plastic formed from non-polar monomers as said carrier;
   applying a liquid primer to the side of said carrier sheet to be coated and thereafter, insofar as necessary, dried; and
   applying to the side of said carrier sheet thus treated an intimate mixture of microporous finely divided solid particles and at least one binding agent forming a firm polymer matrix by at least one of curing and crosslinking to form a layer and thereafter, insofar as necessary, dried.

12. The method of claim 11, wherein said mixture of binding agent and solid particles is applied in an amount of at least about 2 $g/m^2$ with respect to the dry weight.

13. The method of claim 11, wherein at least one of the primer and the binding agent is used in the form of a solution or dispersion in a suitable solvent.

14. The method of claim 11, wherein at least one of the primer and the binding agent is at least one of reactively crosslinking and solvent-free.

15. The method of claim 11, wherein at least one of microporous pigments and fillers are used as finely divided solid particles.

16. The method of claim 11, wherein said mixture of binding agent and solid particles is colored by an addition of at least one of color pigments and luminescent pigments.

17. The method of claim 11, including applying said primer by means of a printing machine.

18. The method of claim 11, including finishing one side of the sheet to be self-adhesive by means of an adhesive layer.

19. The method of claim 11, wherein at least one of the following synthetic or natural polymers is used as said primer: polyacrylates, polymethacrylates, polyesters, polystyrenes, poly-1,3-dienes, polyamides, polyurethanes, polyvinyl butyral, polyvinyl acetate, alkyd resins, urea resins, modified nitrocelluloses, resins modified with shellac or colophony, and their mixed polymers and copolymers.

20. The method of claim 19, wherein said primer is applied in an amount of about 0.2 to 0.5 $g/m^2$ with respect to the dry weight.

21. The method of claim 11, including employing a polyethylene or polypropylene sheet as said carrier sheet.

22. The method of claim 21, including increasing the surface tension of said carrier sheet by corona discharges before said primer is applied.

* * * * *